(12) United States Patent
Yokota

(10) Patent No.: US 7,197,753 B2
(45) Date of Patent: Mar. 27, 2007

(54) RECORDING MEDIUM DRIVE DEVICE

(75) Inventor: Kazuo Yokota, Tokyo (JP)

(73) Assignee: TEAC Corporation, Tokyo (JP)

( * ) Notice: Subject to any disclaimer, the term of this patent is extended or adjusted under 35 U.S.C. 154(b) by 337 days.

(21) Appl. No.: 11/001,673

(22) Filed: Dec. 1, 2004

(65) Prior Publication Data
US 2005/0125814 A1    Jun. 9, 2005

(30) Foreign Application Priority Data
Dec. 2, 2003    (JP)    ............... 2003-403546

(51) Int. Cl.
*G11B 17/04*    (2006.01)
(52) U.S. Cl. .................................... 720/637
(58) Field of Classification Search ............. 720/637, 720/610, 609, 601
See application file for complete search history.

(56) References Cited

U.S. PATENT DOCUMENTS 5,025,334 A * 6/1991 Perona et al. ............... 360/96.5
6,608,965 B1 * 8/2003 Tobimatsu et al. ............ 386/52

FOREIGN PATENT DOCUMENTS

JP    2003-296997    10/2003

* cited by examiner

*Primary Examiner*—Angel Castro
(74) *Attorney, Agent, or Firm*—Weingarten, Schurgin, Gagnebin & Lebovici LLP

(57) ABSTRACT

An object of the invention is to provide a disc drive device capable of compulsively ejecting an optical disc by a manipulation function from the outside to prevent information recorded on the optical disc mounted on the disc drive device from being damaged. A disc drive device 1 for loading and driving an optical disc D to record information thereon or reproduce information recorded thereon comprises a manual ejection prohibiting means 41. Excluding when a carrier block 13 of a head unit B which has an optical pickup 12 is moved to a circumferential moving end of the optical disc D and a corner portion 13A of the carrier block 13 presses a driven part 43, irrespective of whether or not there is an intention for ejecting the optical disc D, even though an emergency pin P is inserted into a through-hole 3c, the optical disc D is prevented from being ejected.

4 Claims, 19 Drawing Sheets

Fig. 18 --- Prior Art ---
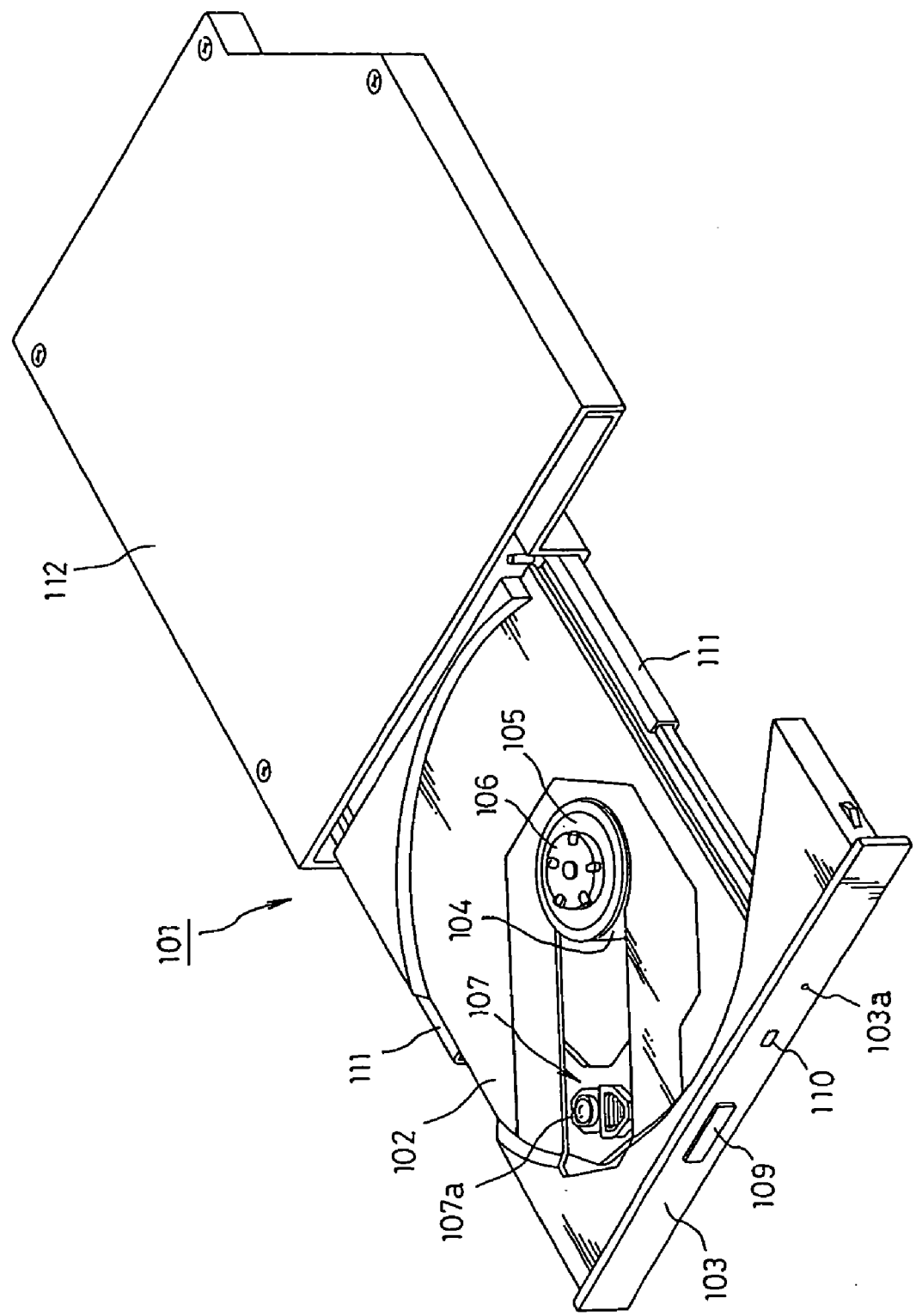

Fig. 19  --- Prior Art ---
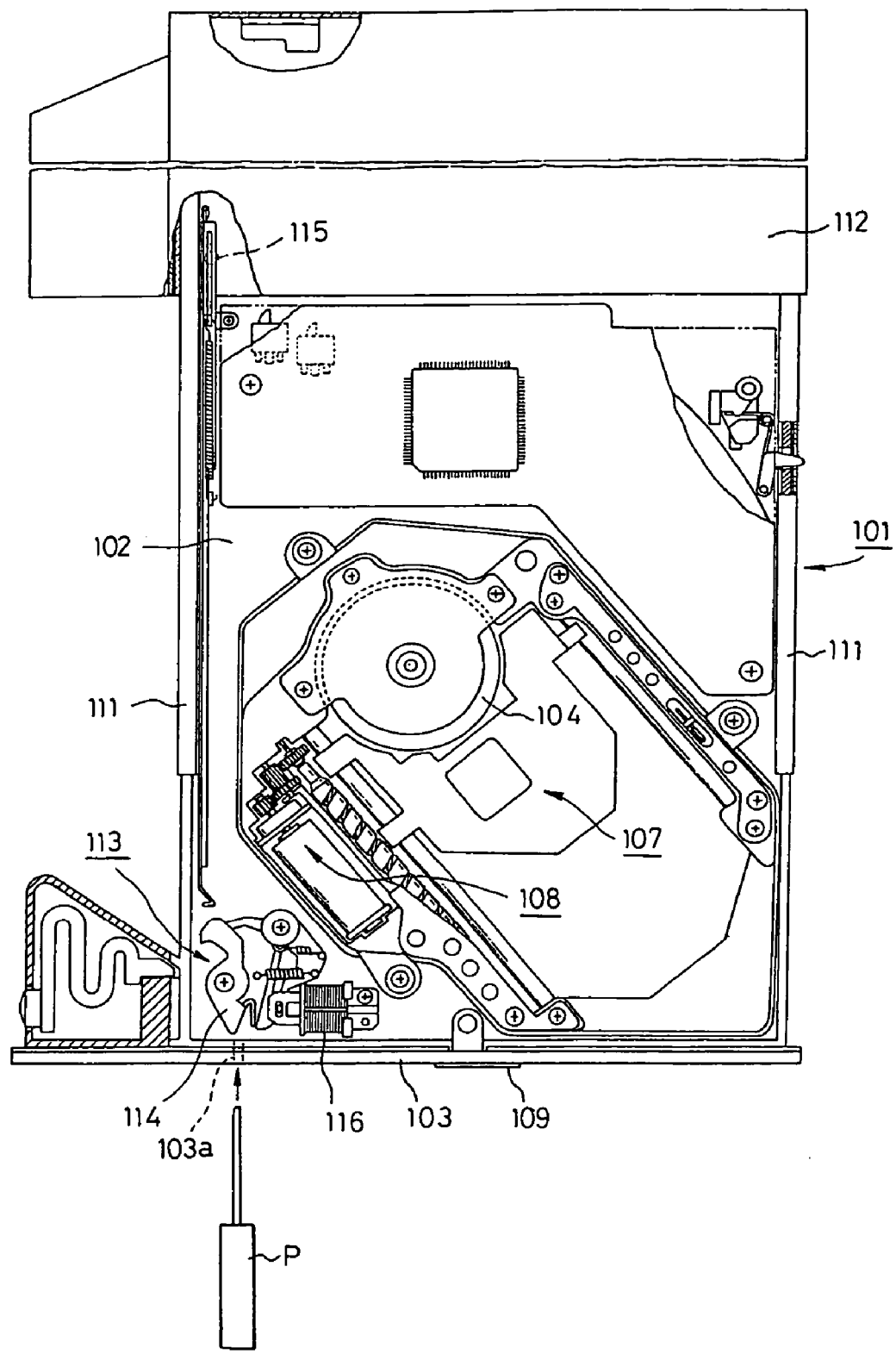

RECORDING MEDIUM DRIVE DEVICE

This application claims priority to a Japanese application No. 2003-403546 filed Dec. 2, 2003.

BACKGROUND OF THE INVENTION

1. Field of the Invention

The present invention relates to a recording medium drive device using a recording medium such as an optical disc (for example, CD-R/RW, DVD-R/-RW/RAM/+R/+RW) and the like on which a large amount of information can be recorded in various computer systems, etc.

2. Description of the Related Art

Generally, in a personal computer, for processing a large amount of information, a recording medium drive device must be provided to drive an optical disc serving as a recording medium on which the large amount of information is to be recorded. The recording medium drive device is typically installed into the main body of a personal computer, or is provided outside the personal computer having connected with a cable.

FIG. 17 is a perspective view illustrating an outer appearance of a notebook type personal computer being provided with a recording medium drive device. Such a disc type recording medium drive device (hereinafter, referred to as "disc drive device") 101 is usually installed in the main body of a personal computer. In the disc drive device, by a switching action or a command from a main board of the personal computer, a bezel 103 of a disc tray 102 is popped out, and a user of the personal computer can draw out the disc tray 102 and load an optical disc D on the disc tray 102.

FIG. 18 is a perspective view illustrating an outer appearance of such a conventional disc drive device 101, and FIG. 19 is a bottom view illustrating a construction of the disc tray 12 in the disc drive device 101. The disc tray 102 has a plate-like configuration for accommodating the optical disc D. At a center of the disc tray 102, a turntable 105 is located. The turntable 105 is fixed to a drive shaft of a spindle motor 104 which is placed directly below the turntable 105. The turntable 105 has a clamp head 106 for clamping the optical disc D in a center opening of the optical disc D and for transferring rotational force of the spindle motor 104 to the optical disc D.

The reference numeral 107 indicates a head unit. The entire head unit 107 can be reciprocated in a diametric direction of the disc tray 102 by means of a drive mechanism 108 which is constructed on a lower surface of the disc tray 102. The head unit 107 has a beam lens 107a for radiating laser beam onto the optical disc D. The bezel 103 is secured to a front end of the disc tray 102 to render a neat exterior. A push button 109 for releasing a loading state of the disc tray 102 and an indicator window 110 are provided to the bezel 103. Also, a through-hole 103a is defined in the bezel 103 such that an emergency pin P can be inserted into the through-hole 103a to compulsively release a locked state of the disc tray 102.

The disc tray 102 thus constructed is supported by guide rails 111 in a state in which its both sides are fitted into the guide rails 111, respectively. The guide rails 111 are slidably supported by support rails which are fixed to a chassis case 112. By this construction, the disc tray 102 can be extended out of and retracted into the chassis case 112 to load and unload the optical disc D.

The disc drive device 101 is provided with an ejecting and locking mechanism 113. When the disc tray 102 is loaded with the optical disc D and stopped at a predetermined position in the chassis case 112, the ejecting and locking mechanism 113 functions to maintain this state, that is, lock the disc tray 102. The ejecting and locking mechanism 113 further functions to release the locked state of the disc tray 102 to thereby eject the disc tray 102. The disc tray 102 is locked by the ejecting and locking mechanism 113 in a manner such that a lock lever 114 and a lock pin 115 secured to the chassis case 112 are engaged with each other. In a normal operating state, the release of this locked state, that is, the ejection of the disc tray 102 is caused by driving a self-supporting type solenoid 116 (for example, see Patent Document 1).

[Patent Document 1]

Japanese Patent Application No. 2002-97076

In the case that the disc drive device 101 constructed as mentioned above is installed in the main body of the personal computer, in order to unload the disc tray 102, as described above, the ejecting and locking mechanism 113 is operated by the command from the main board of the personal computer or through the manipulation of the push button 109 by the user so that the release of the locked state, that is, the ejection of the disc tray 102 is carried out.

However, as a rare occurrence of failure in the personal computer, there may be a case in which the personal computer operates a system without recognizing the optical disc upon starting the personal computer while the optical disc still mounted on the disc drive device. In this state, since the disc tray cannot be unloaded even when a user presses the push button, it is impossible to take out the optical disc loaded on the disc tray. This situation may also occur from the breakdown of a mechanical system installed on the disc tray. Therefore, to deal with such an emergency situation, conventional measures are provided.

Such measures are devised with the aim of compulsively releasing the locked state of the disc tray from the outside. As shown in FIG. 19, by inserting the emergency pin P into the through-hole 103a defined in the bezel 103, the lock lever 114 can be rotated and disengaged from the lock pin 115.

This function of dealing with such an abnormal state by the compulsive manipulation from the outside must be necessarily provided to the disc drive device. In carrying out the compulsive manipulation, when the optical disc is in a reading mode in which information recorded on the optical disc is reproduced, the possibility of damaging the recorded information is very low. However, when the optical disc is in a writing mode in which information is being recorded on the optical disc, an incomplete recording of information or damage of already recorded information may be caused.

In this regard, because the ejecting and locking mechanism disclosed in Patent Document 1 is operated by a simple manipulation of the emergency pin, the probability of having an incomplete recording of information or damage of already recorded information is substantial. For example, since an unskilled or unaccustomed person may inadvertently operate the ejecting and locking mechanism while the optical disc is in the writing mode, it is necessary to also take appropriate measures for avoiding this undesirable situation.

SUMMARY OF THE INVENTION

Accordingly, it is an object of the present invention to provide a disc drive device capable of compulsively ejecting an optical disc by a manipulation function conducted from the outside to prevent information recorded on the optical disc loaded on the disc drive device from being damaged.

In order to achieve the above object, according to one aspect of the present invention, there is provided a recording medium drive device comprising a recording medium entrance port through which a recording medium is inserted into and ejected from the device, a recording medium mounting section which supports the recording medium inserted into the device through the recording medium entrance port and performs a function of reading information from the recording medium and/or writing information on the recording medium, an automatic ejection mechanism which has an electrical drive means operating in response to a switching action to automatically eject through the recording medium entrance port the recording medium mounted on the recording medium mounting section, and a manual ejection mechanism which is provided to a casing which has no electrical drive means and allows the recording medium mounted on the recording medium mounting section to be manually manipulated and ejected through the recording medium entrance port. A manual ejection prohibiting means is installed in the device to prohibit the manual ejection mechanism from being operated when the recording medium mounting section is in a predetermined state.

In the recording medium drive device according to the present invention, since the recording medium drive device comprises the manual ejection prohibiting means for prohibiting the manual ejection mechanism from being operated when the recording medium mounting section is in a predetermined state, it is possible to limit timing when manually ejecting the recording medium. Due to this fact, a possibility of the recording medium to be ejected while information is recorded on the recording medium is eliminated, whereby it is possible to prevent an information recording task from ending in a failure and provide a recording medium drive device of high reliability.

BRIEF DESCRIPTION OF THE DRAWINGS

FIG. 18 is a perspective view illustrating an outer appearance of a conventional disc drive device; and FIG. 19 is a bottom view illustrating an internal structure of the conventional disc drive device.

DESCRIPTION OF THE PREFERRED EMBODIMENTS

Figure 1:
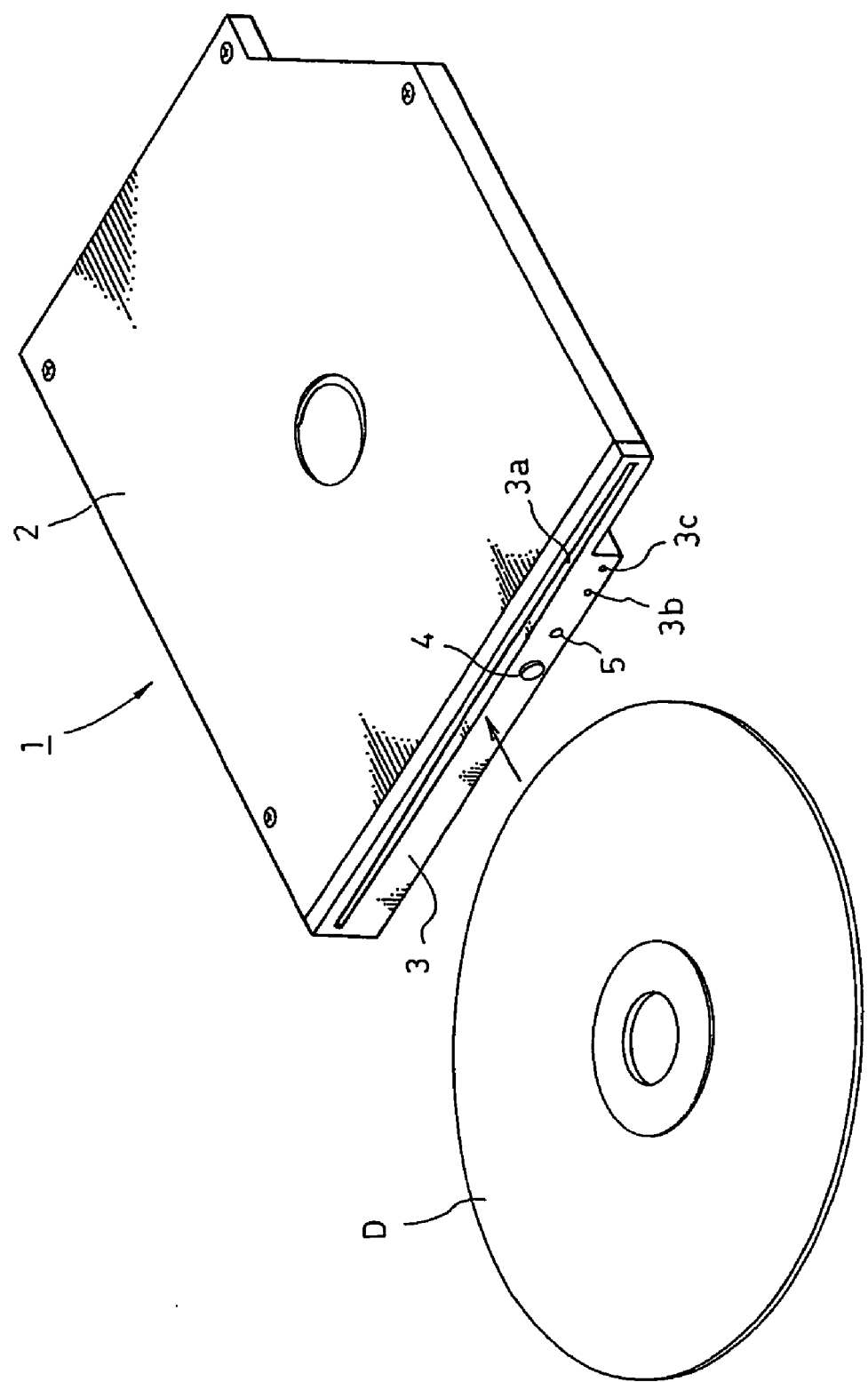
FIG. 1 is a perspective view illustrating an outer appearance of a disc drive device according to the present invention.

According to the present invention, a recording medium drive device comprises a recording medium entrance port through which a recording medium is inserted into and ejected from the device, a recording medium mounting section which supports the recording medium inserted into the device through the recording medium entrance port and performs a function of reading information from the recording medium and/or writing information on the recording medium, an automatic ejection mechanism which has an electrical drive means operating in response to a switching action to automatically eject through the recording medium entrance port the recording medium mounted on the recording medium mounting section, and a manual ejection mechanism which is provided to a casing which has no electrical drive means and allows the recording medium mounted on the recording medium mounting section to be manually manipulated and ejected through the recording medium entrance port. A manual ejection prohibiting means is installed in the device to prohibit the manual ejection mechanism from being operated when the recording medium mounting section is in a predetermined state. A disc-shaped recording medium is used as the recording medium. The recording medium mounting section comprises recording medium supporting means for rotatably supporting the recording medium, and head means which is installed to be movable in a radial direction of the recording medium supported by the recording medium supporting means for reading recorded information from the recording medium and/or writing information on the recording medium. The manual ejection prohibiting means allows the manual ejection mechanism to be operated when the head means is positioned on a circumferential moving end of the recording medium and prohibits the manual ejection mechanism from being operated when the head means is not positioned on the circumferential moving end of the recording medium.

Further, the manual ejection prohibiting means comprises a driven part which is not driven by the head means in a pressed manner when the head means is not positioned on the circumferential moving end of the recording medium and is driven by the head means in a pressed manner when the head means is moved to the circumferential moving end of the recording medium, and a prohibiting part which allows the manual ejection mechanism to be operated when the driven part is driven by the head means in the pressed manner and which prohibits the manual ejection mechanism from being operated when the driven part is not driven by the head means in the pressed manner. Furthermore, when the driven part is driven in the pressed manner by the head means moved to the circumferential moving end of the recording medium, the prohibiting part is not interposed between the movable part of the manual ejection mechanism and the casing to permit the movable part to be moved toward the casing to thereby allow the manual ejection mechanism to be operated, and when the driven part is not driven in the pressed manner by the head means not positioned at the circumferential moving end of the recording medium, the prohibiting part is interposed between a movable part of the manual ejection mechanism and the casing to prevent the movable part from being moved toward the casing to thereby prohibit the manual ejection mechanism from being operated.

[Embodiment 1]

Hereinafter, an example in which the present invention is applied to a slot-in-type disc recording medium drive device will be described with reference to attached drawings.

FIG. 1 is a perspective view illustrating an outer appearance of a disc drive device 1 which is completed by the present invention. A bezel 3 is secured to an opening defined at a front end of chassis case 2 which is constructed in a sealed state as a casing. A slot 3a for insertion of an optical disc D and through-holes 3b and 3c for emergency release are defined in the bezel 3. The bezel 3 is provided with a push button 3 for commanding ejection of the accommodated optical disc D to the outside and an indicator 5 for indicating an operating state of the disc drive device 1.

Figure 2:
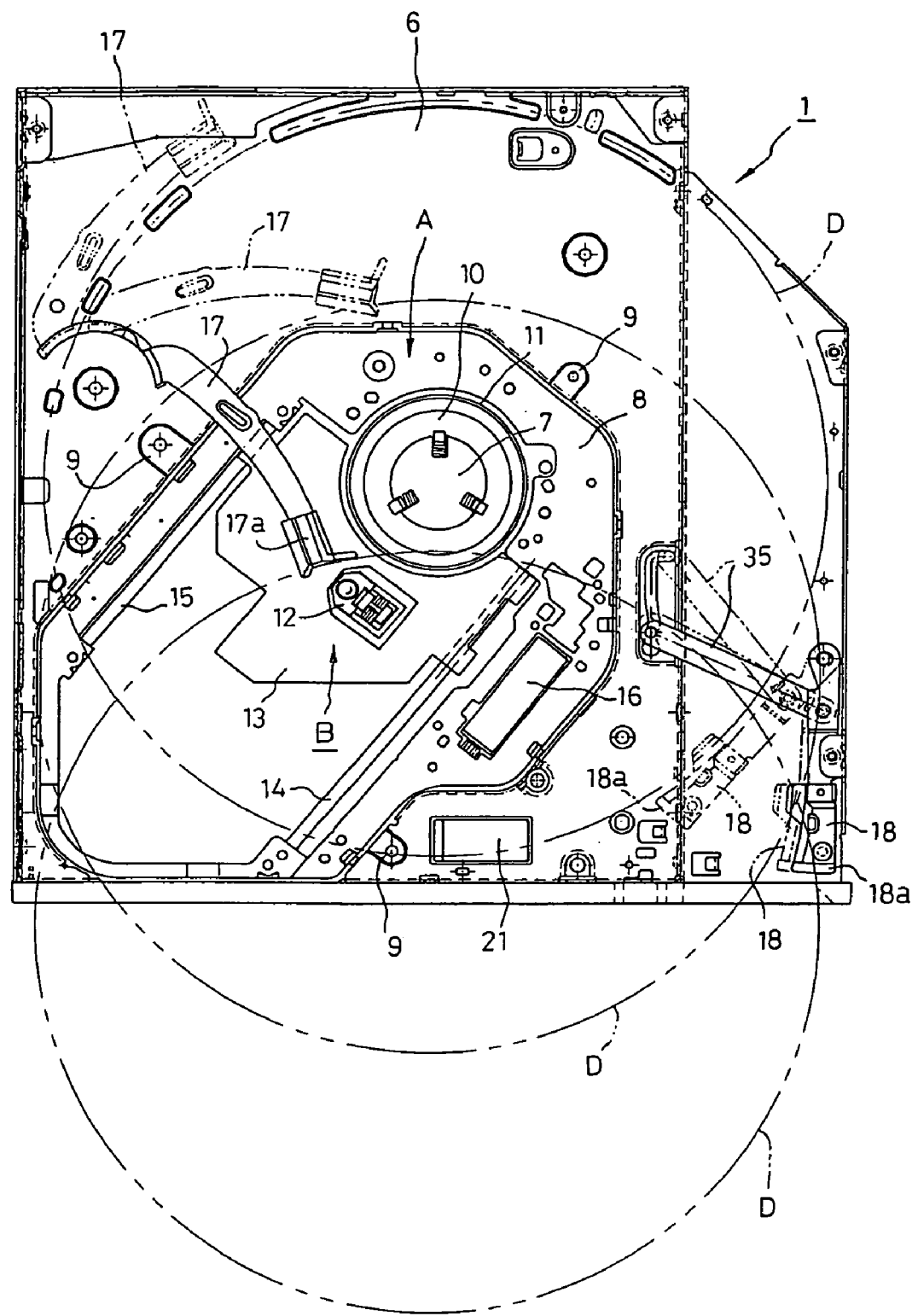
FIG. 2 is a plan view illustrating an internal structure of the disc drive device of FIG. 1.
Figure 3:
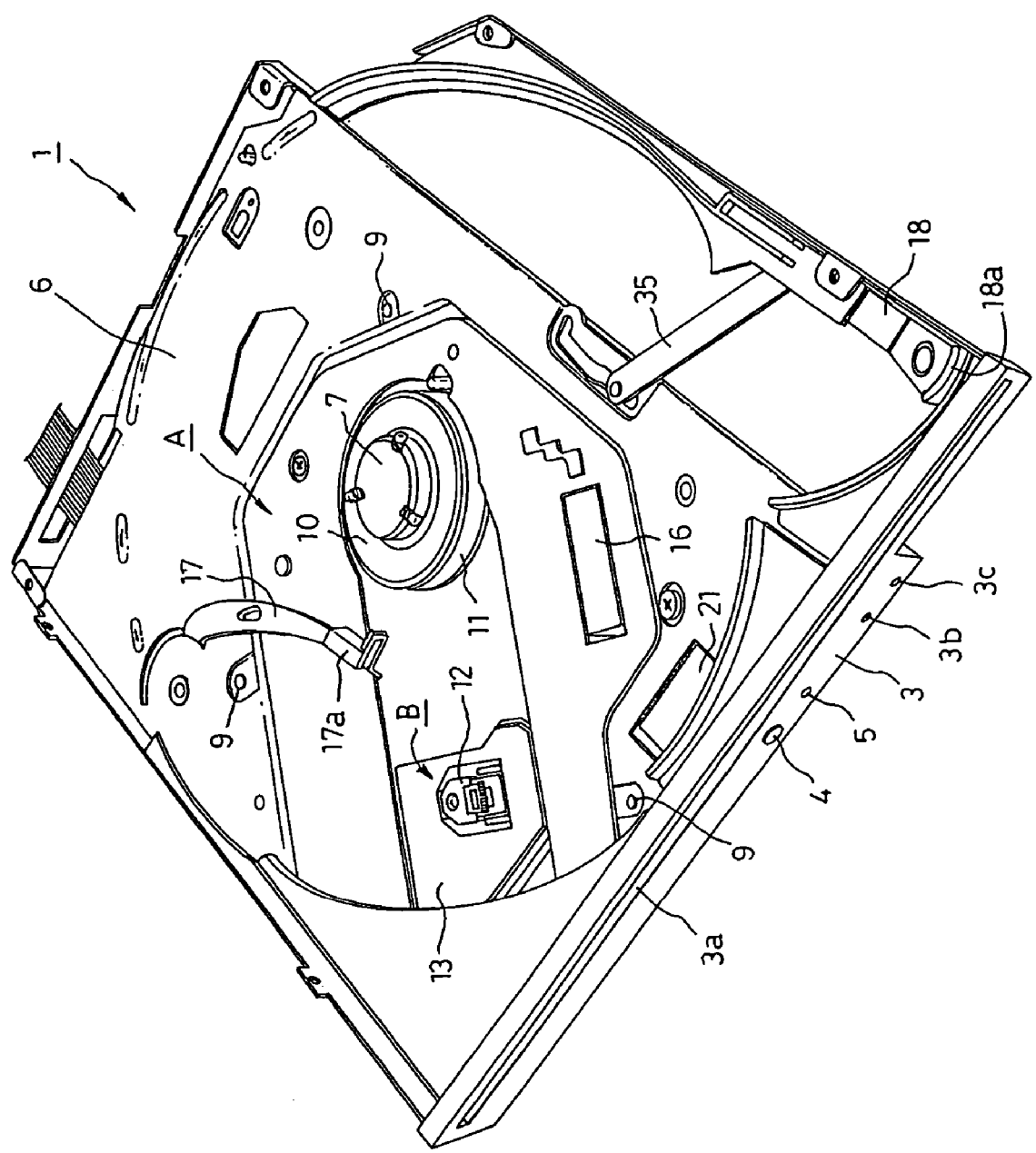
FIG. 3 is a perspective view illustrating the internal structure of the disc drive device of FIG. 1.

FIG. 2 is a plan view illustrating the disc drive device 1 with the uppermost plate removed, and FIG. 3 is a perspective view thereof. In these drawings, a base panel 6 is located in the chassis case 2, and a driving unit A for driving the optical disc D is installed to be inclinedly located from a center of the base panel 6. In the driving unit A, in order to clamp or unclamp a center opening of the optical disc D when loading or unloading the optical disc D onto and from the chassis case 2, a frame member 8 which is structured to be slightly moved upward and downward in a vertical direction is connected to the base panel 6 by way of a plurality of shock-absorbing support structures 9.

A clamp head 7 is located at a distal end of the frame member 8 at a position which corresponds to a center of the optical disc loaded and maintained in a stopped state. The clamp head 7 is constructed integrally with a turntable 10, and is secured to a driving shaft of a spindle motor 11 which is located directly below the clamp head 7. By the spindle motor 11, the optical disc D clamped by the clamp head 7 can be driven to rotate.

The reference character B denotes a head unit. The head unit B is secured to a carrier block 13 which functions to reciprocate an optical pickup 12 in a diametric direction of the optical disc D. The carrier block 13 is supported by guide shafts 14 and 15 which are positioned at both sides of the carrier block 13. The carrier block 13 is reciprocated by a sled motor 16 and a gear unit (not shown).

The reference numeral 17 indicates an ejection lever for ejecting the optical disc D out of the chassis case 2, and the reference numeral 18 indicates a guide lever for guiding the introduced optical disc D into the chassis case 2. The ejection lever 17 and the guide lever 18 are constructed in a manner such that their distal ends 17a and 18a are sequentially driven to be rotated by a link mechanism 19 shown in FIG. 4 to thereby allow the optical disc D to be automatically inserted into the chassis case 2.

Specifically, if the optical disc D is inserted through the slot 3a of the bezel 3 as shown in FIG. 2, a front end of the optical disc D is brought into contact with the distal end 17a of the ejection lever 17. Then, as the optical disc D is continuously inserted through the slot 3a of the bezel 3, the ejection lever 17 is rotated so that the distal end of the ejection lever 17 is retracted into the chassis case 2 to be brought into contact with a limit switch 20 shown in FIG. 4. By this construction, on the basis of a signal from the limit switch 20, a conveying mechanism C for conveying the optical disc D, which will be described later, is started to be driven.

Figure 5:
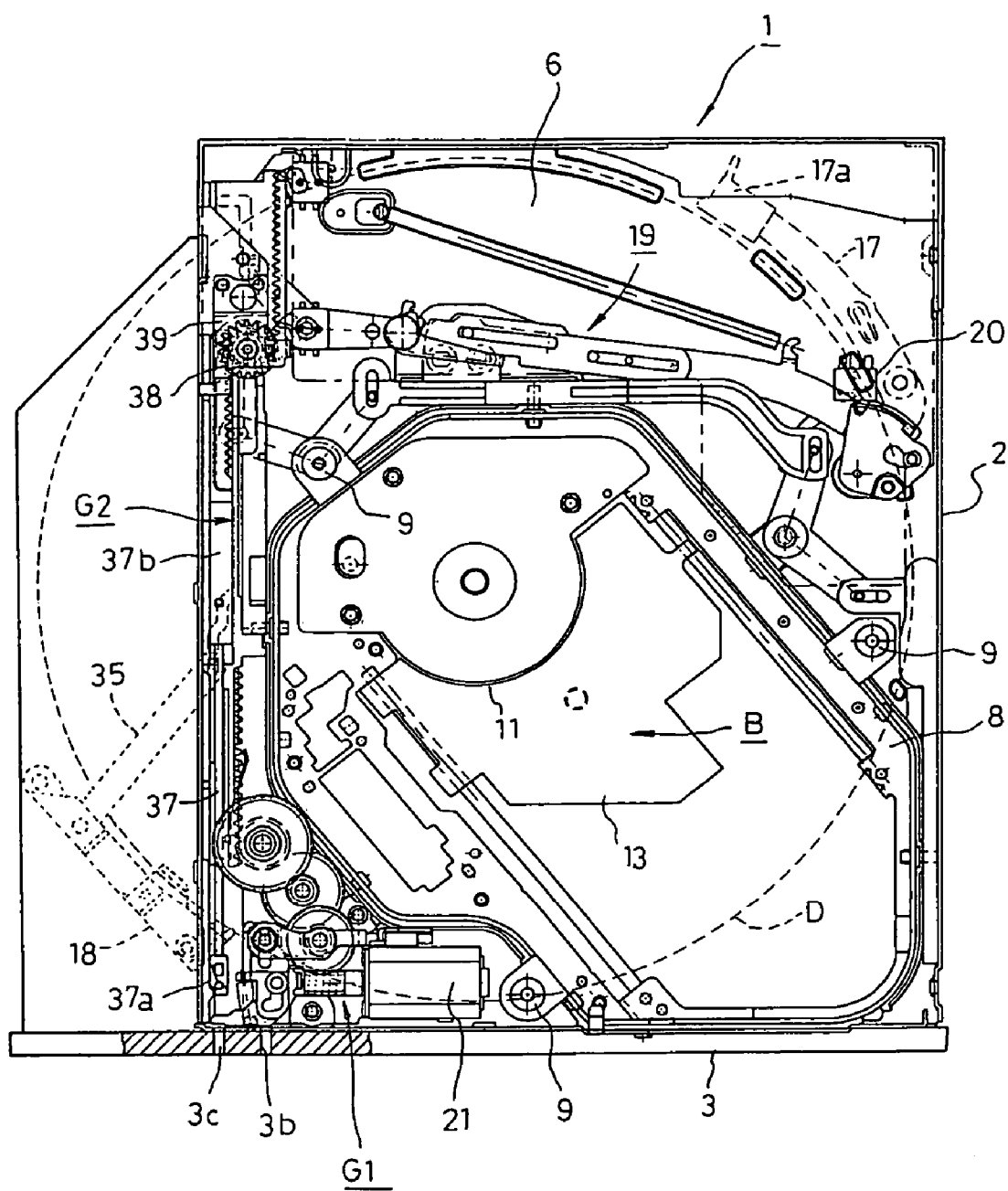
FIG. 5 is a view for explaining operations of the disc drive device of FIG. 1.

In this state, due to the movement of the conveying mechanism C, the guide lever 18 is rotated so that the distal end of the guide lever 18 is brought into contact with a rear end of the optical disc D, to continuously insert the optical disc D into the chassis case 2. Thereafter, as shown in FIG. 5, when the center opening of the optical disc D is aligned with the clamp head 7, the guide lever 18 is stopped. Then, as the frame member 8 is raised by the driving force of a loading motor, the clamp head 7 supported by the frame member 8 clamps the center opening of the optical disc D.

Meanwhile, when it is necessary to eject the optical disc D inserted into the chassis case 2 in this way, by manipulating the push button 4 of the bezel 3 or the command from a main board of a personal computer, the conveying mechanism D is driven in an opposite direction. Due to this fact, the frame member 8 is lowered to unclamp the optical disc D, and the ejection lever 17 is rotated so that the distal end 17a of the ejection lever 17 ejects the optical disc D to the position shown in FIG. 4.

Figure 6:
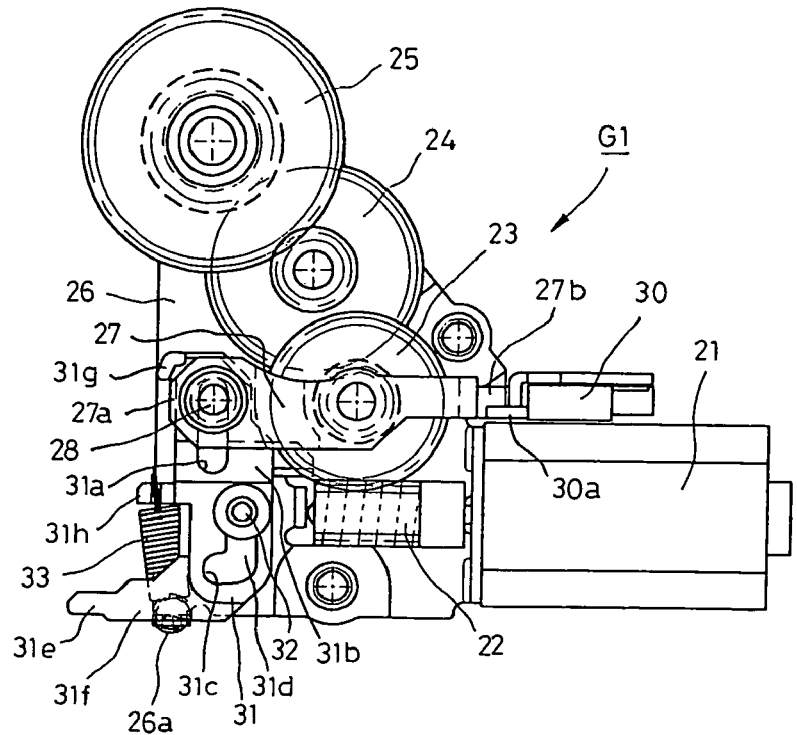
FIG. 6 is a view for explaining a loading gear unit.
Figure 6:
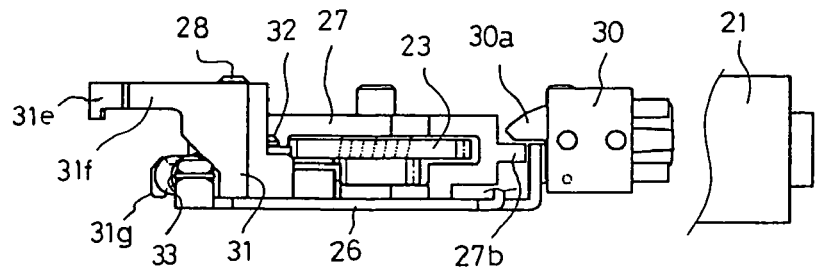
Figure 6:
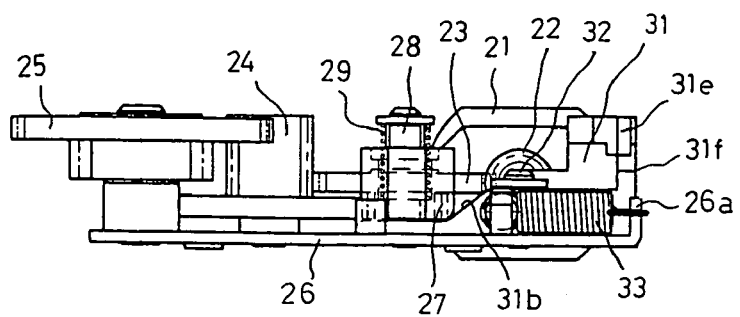
Figure 7:
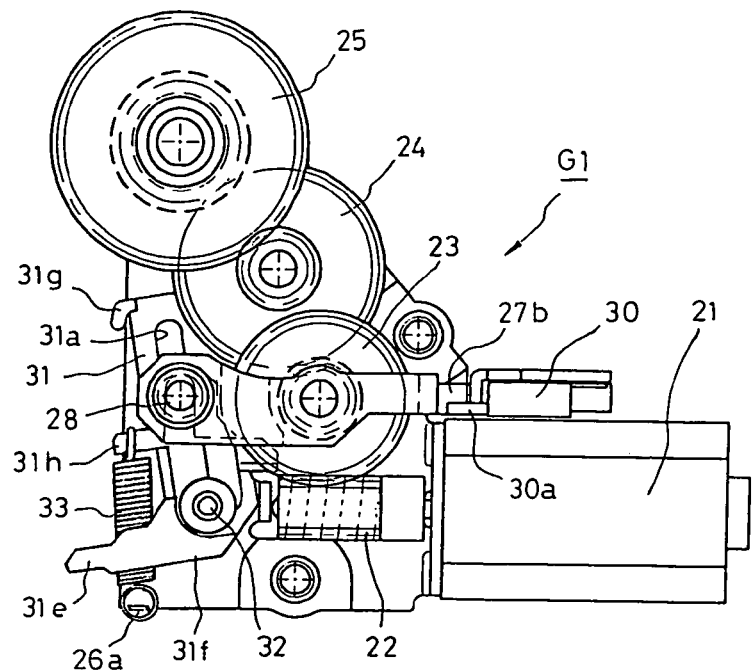
FIG. 7 is a view for explaining operations of the loading gear unit.
Figure 7:
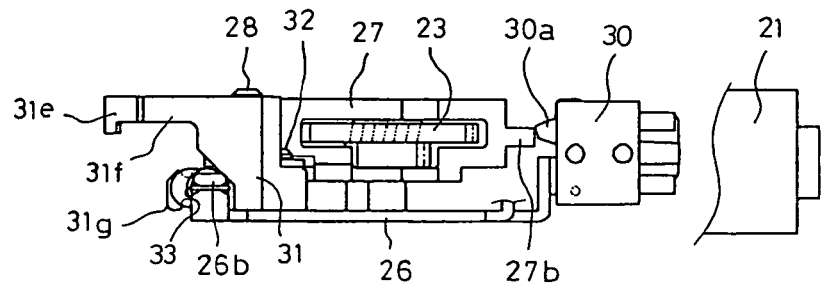
Figure 7:
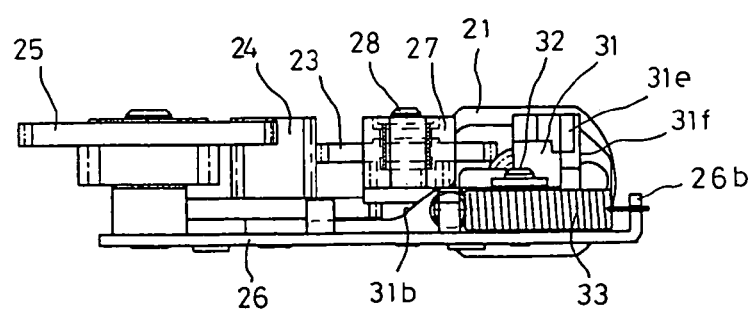

Next, a construction of the conveying mechanism C for inserting and ejecting the optical disc D through the automatic operation as described above will be described. The conveying mechanism C largely comprises a loading gear unit G1 and a rack gear unit G2. FIGS. 6 and 7 are views for explaining mechanisms and operational states of the loading gear unit G1. In these drawings, the reference numeral 21 represents a loading motor serving as a power source for the automatic operation. A worm gear 22 is secured to an output shaft of the loading motor 21 to be rotated integrally therewith. A rotational force of the worm gear 22 is sequentially transmitted to double gears 23, 24 and 25 which are rotatably supported by shafts on a gear base 26, from a gear having the smallest diameter toward a gear having the largest diameter, while gradually reducing a velocity. The loading gear unit G1 is mounted so that its upper side in FIGS. 6B and 6C faces a lower plate of the chassis case 2.

In the above construction of the gears, the double gear 23 has a release mechanism for releasing a state in which the double gear 23 is meshed with the worm gear 22. The release mechanism comprises a holder 27 which supports the double gear 23 and is slidable in upward and downward directions. An end 27a of the holder 27 is fitted around a pivot pin 28 and is elastically biased downward by a compression coil spring 29. Due to these facts, in a normal state as shown in FIG. 6C, the worm gear 22 and the double gear 23 are meshed with each other. Also, the end of the holder 27 which is adjacent to the loading motor 21 is formed with a dog head portion 27b which functions to operate a knob 30a of a limit switch 30 fixed to the gear base 26.

A slider member 31 which is coaxially supported by the pivot pin 28 is installed on a lower surface of the end 27a of the holder 27. A portion of the slider member 31 which is supported by the pivot pin 28 is defined with an elongated groove 31a. Due to the presence of the slot 31a, the slider 31 can be slid in a direction perpendicular to the end 27a of the holder 27. Between front and rear ends of the slider member 31, the slider member 31 is has an inclined surface 31b. When the slider member 31 is moved forward, the inclined surface 31b pushes upward the end 27a of the holder 27, whereby the entire holder 27 is raised.

Adjacent to a rear end of the slider member 31, the slider member 31 is defined with an elongated groove 31d in which a pivot pin 32 is fitted. The elongated groove 31d has a locking portion 31c. An operating piece 31f having a plugging projection 31e is formed at the rear end of the slider member 31. A reset piece 31g which is operated on the basis of the movement of the rack gear unit G2 is formed at the front end of the slider member 31.

In the slider member 31 integrally constructed in this way, a tensile coil spring 33 is inclinedly installed between a rack piece 31h of the slider member 31 and a hook piece 26a of the gear base 26. The slider member 31 is elastically biased by the tensile coil spring 33 to be retreated and rotated in a counterclockwise direction.

Due to the fact that the slider member 31 is constructed as described above, in the normal state as shown in FIG. 6, the slider member 31 is basically supported by the pivot pin 28. In this state, as the slider member 31 is pressed in a forward direction and the pivot pin 32 reaches the locking portion 31c of the elongated groove 31d, the slider member 31 is pivoted about the pivot pin 28 by a tensile force of the tensile coil spring 33, and finally, as shown in FIG. 7, the pivot pin 32 is engaged with the locking portion 31c of the elongated groove 31d to effect a locked state. The slider member is maintained in the locked state.

Figure 8:
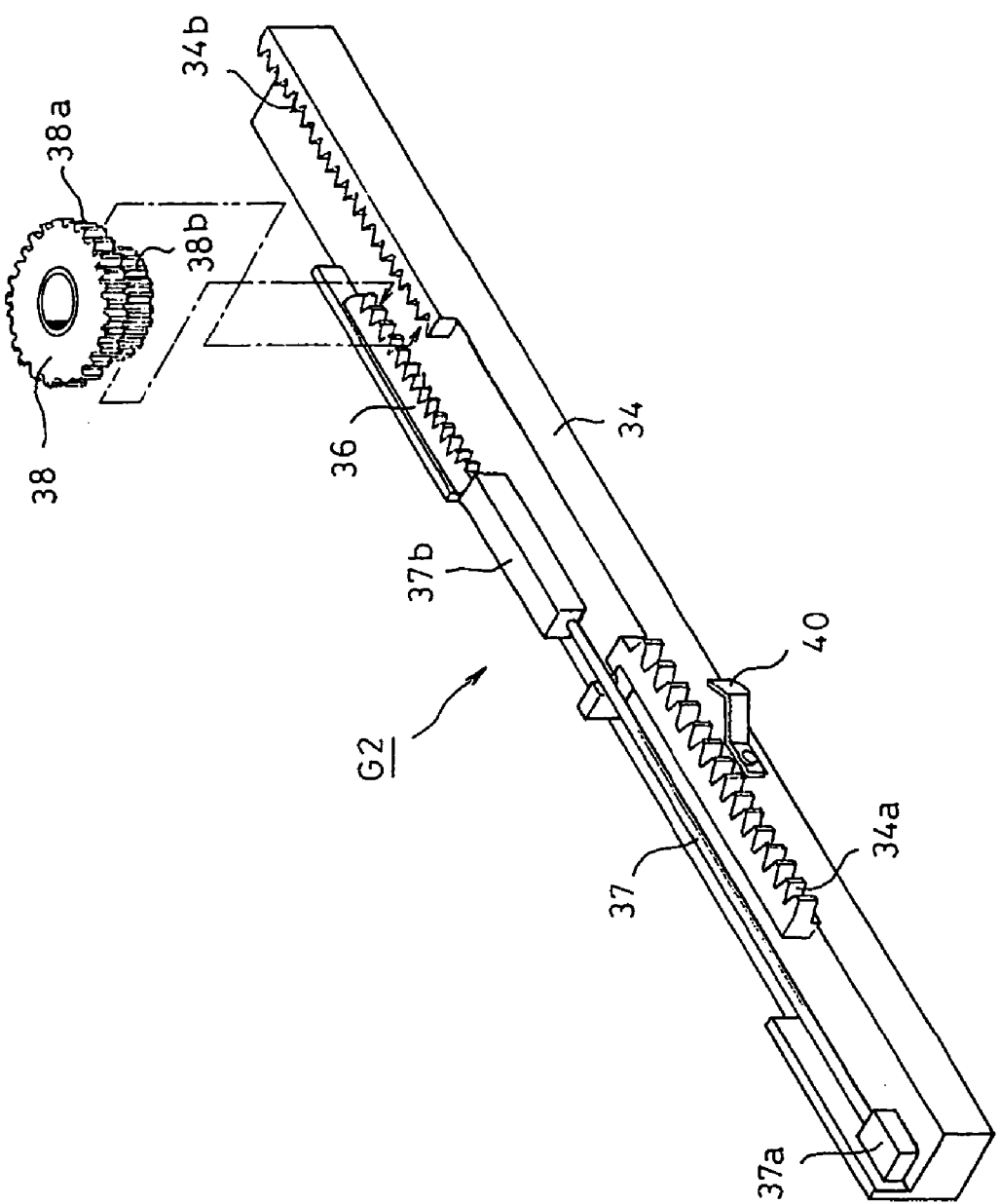
FIG. 8 is a perspective view illustrating a construction of a rack gear unit.

Referring to FIG. 8, the rack gear unit G2 has a rack main body 34. Gear sections 34a and 34b are formed integrally on the rack main body 34. The gear section 34a is meshed with a small-diameter gear portion of the double gear 25 of the loading gear unit G1. Accordingly, by driving the loading motor 21, the rack main body 34 is moved forward and rearward in the chassis case 2. By moving the rack main body 34 forward and rearward in this way, the link mechanism 19 connected to a distal end of the rack main body 34 is driven and the ejection lever 17 is driven to rotate. At the same time, as shown in FIG. 2, the guide lever 18 is rotated by a lever member 35 which is connected to the rack main body 34 on the surface of the base panel 6. Also, as the link mechanism 19 is driven, the frame member 8 is driven to be moved upward or downward in synchronism with the link mechanism 19, whereby the clamp head 7 clamps or unclamps the optical disc D.

On the rack main body 34 constructed as described above, a gear member 36 is placed to be freely moved forward or backward on the distal end of the rack main body 34. In order to move forward the gear member 36, a push pin 37 having block portions 37a and 37b at front and rear ends thereof is disposed on the rack main body 34. The gear section 34b and the gear member 36 are meshed with a double gear 38 which is mounted to a gear frame 39 to be freely rotated. In this case, a large-diameter portion 38a of the double gear 38 is meshed with a rear end of the gear section 34b, and a small-diameter portion of the double gear 38 is meshed with a front end of the gear member 36 which is formed integrally with the block portion 37b.

Hence, if the gear member 36 is moved forward by an external force applied through the push pin 37, since the double gear 38 is rotated in a fixed position, a rotational force of the large-diameter portion 38a is transmitted to the gear section 34b, and thereby, the rack main body 34 is moved rearward. The reference numeral 40 indicates an operating piece for pressing the reset piece 31g which is formed at the front end of the slider member 31 of the loading gear unit G1. When the loading gear unit G1 is in a state as shown in FIG. 7, as the operating piece 40 presses the reset piece 31g of the slider member 31, since the engagement between the pivot pin 32 and the locking portion 31c of the elongated groove 31d is released, the slider member 31 is returned to the state shown in FIG. 6.

In this construction, compulsive ejection of the optical disc D which is accommodated in the chassis case 2 is effected by rotating the ejection lever 37 as described above. However, since the rotation driving of the ejection lever 17 is effected by rearward movement of the rack main body 34, an emergency pin P must be inserted into the through-hole 3c defined in the bezel 3.

Figure 9:
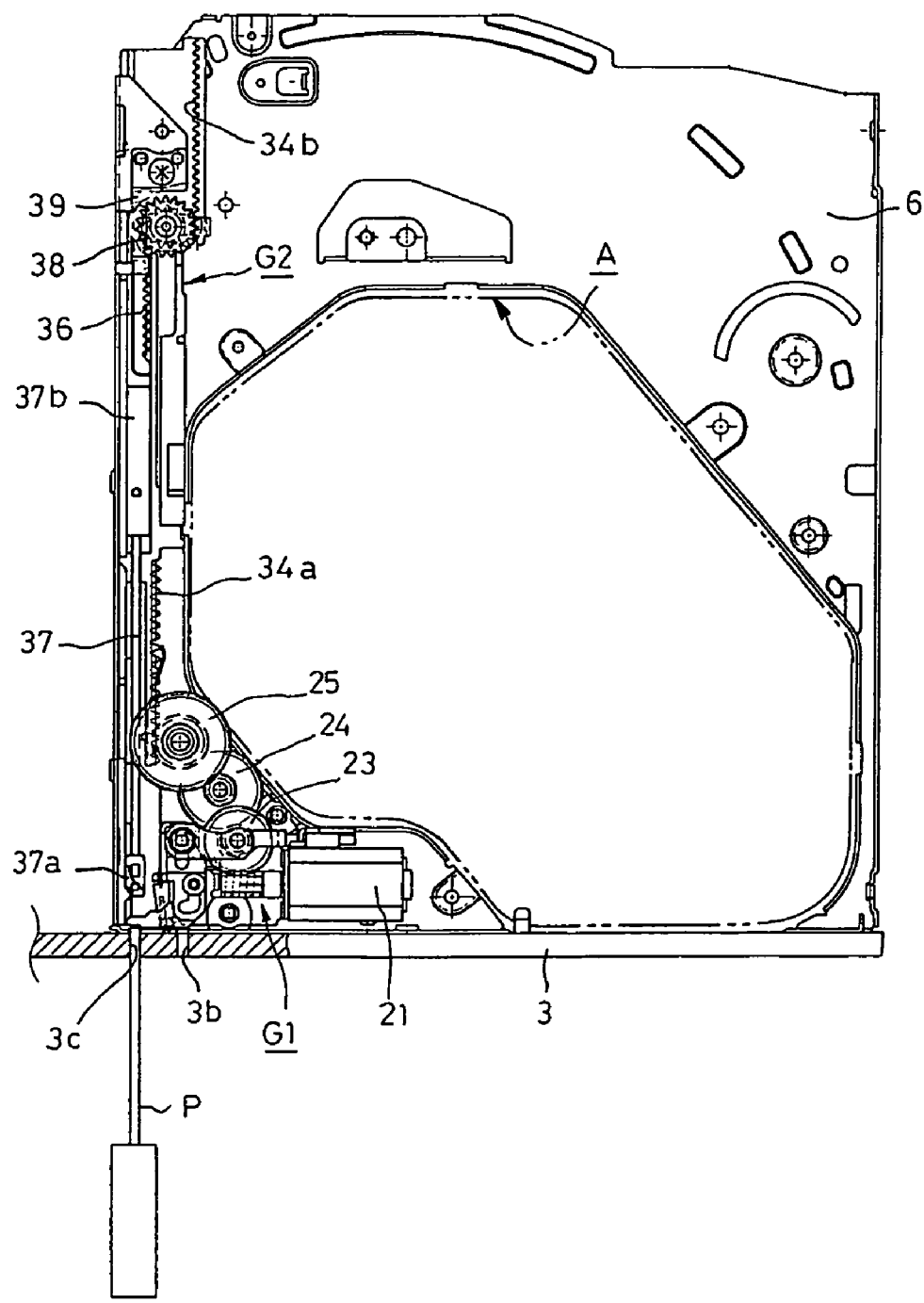
FIG. 9 is a view for explaining emergency manipulation.

However, when the slider member 31 of the loading gear unit G1 is in a normal position as shown in FIG. 9, since the plugging projection 31e plugs the through-hole 3c, the emergency pin P cannot be properly inserted into the through-hole 3c. Thus, in this state, because the rack main body 34 cannot be moved, irrespective of an intention for ejecting the optical disc D, even when a user tries to insert the emergency pin P into the through-hole 3c, the optical disc D cannot be ejected from the chassis case 2.

Figure 10:
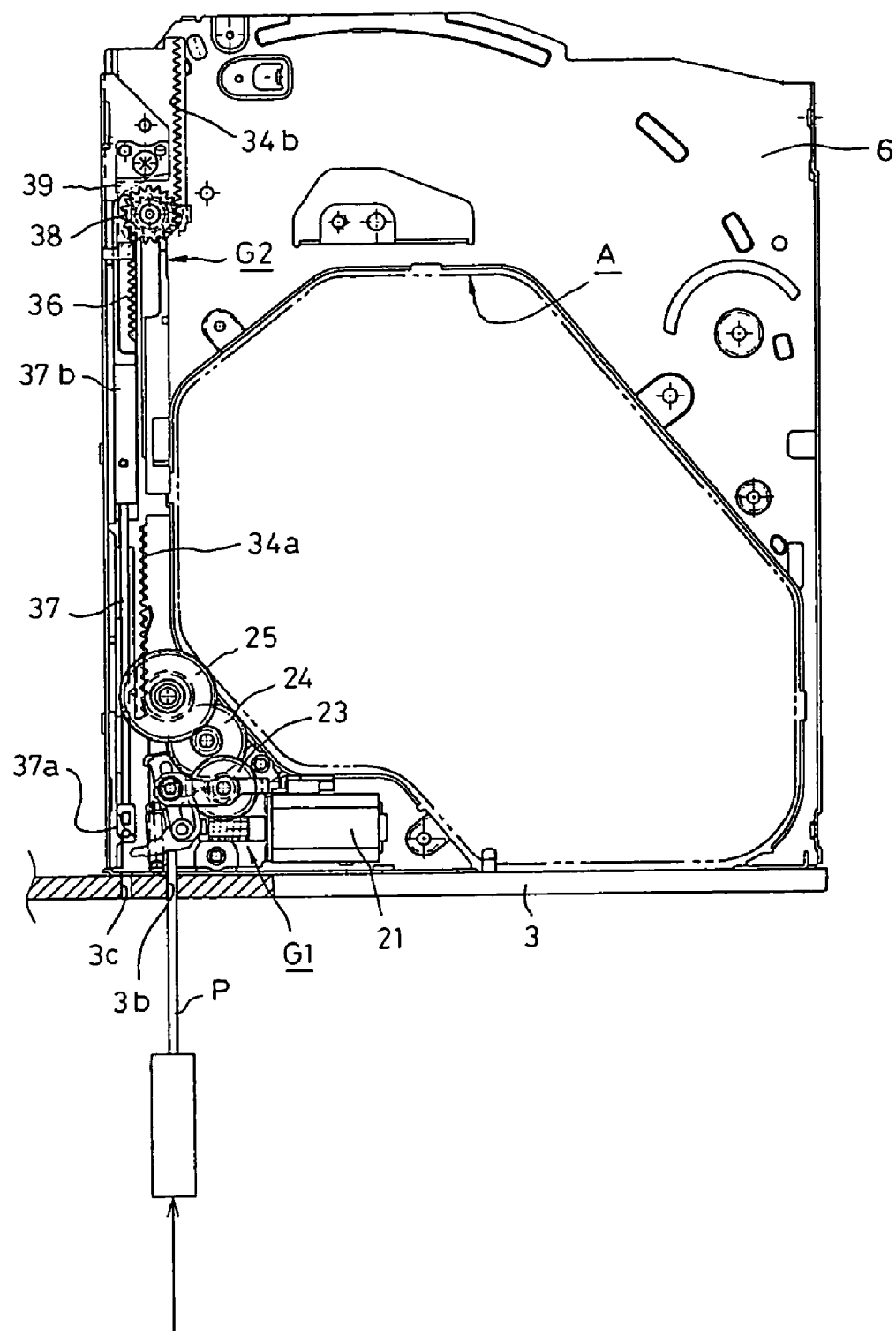
FIG. 10 is a view for explaining the emergency manipulation.

Meanwhile, if it is clear that the user has an intention for ejecting the optical disc D, first, as shown in FIG. 10, the emergency pin P is inserted into the through-hole 3b defined in the bezel 3 to press the slider member 31 of the loading gear unit G1. By doing this, as the slider member 31 is tilted, the plugged state by the plugging projection 31e plugged into the through-hole 3c is released. At this time, since the inclined surface 31b of the slider member 31 pushes upward the end 27a of the holder 27, the meshed state between the worm gear 22 and the double gear 23 is released, whereby the double gears 23, 24 and 25 can be freely rotated. At this time, if the spindle motor 11 rotatably drives the optical disc D, as the dog head portion 27b of the holder 27 is brought into contact with the knob 30a to turn on the limit switch 30, the spindle motor 11 is stopped.

Figure 4:
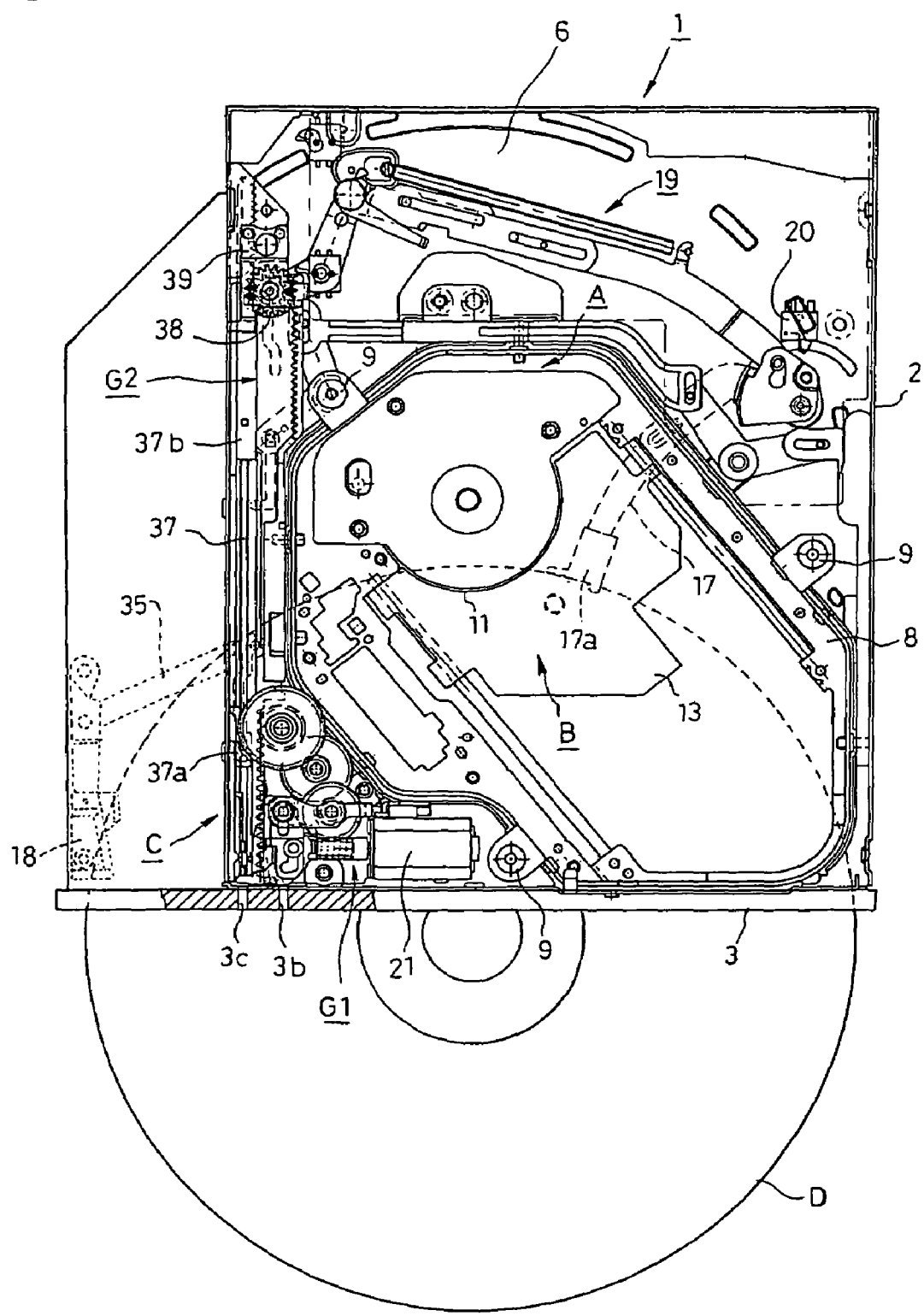
FIG. 4 is a bottom view illustrating the internal structure of the disc drive device of FIG. 1.
Figure 11:
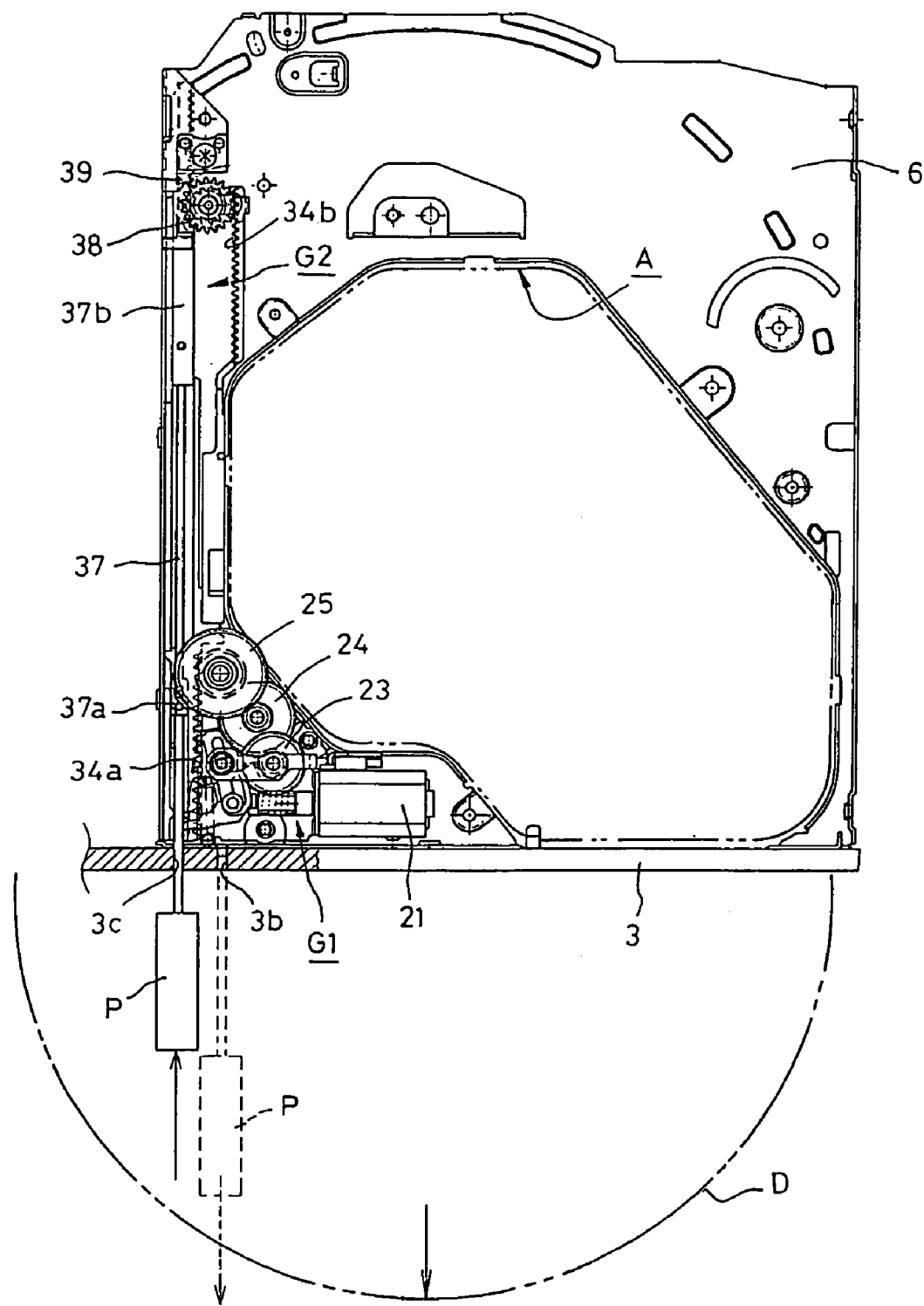
FIG. 11 is a view for explaining the emergency manipulation.

After manipulation from the through-hole 3b is completed in this way, by removing the emergency pin P from the through-hole 3b and inserting and pressing the emergency pin P into the hole 3c, as shown in FIG. 11, as the gear member 36 is moved forward, the rack main body 34 is moved rearward. By this, the frame member 8 is lowered to unclamp the optical disc D, and the ejection lever 17 is rotated to eject the optical disc D as shown in FIGS. 11 and 4.

Figure 12:
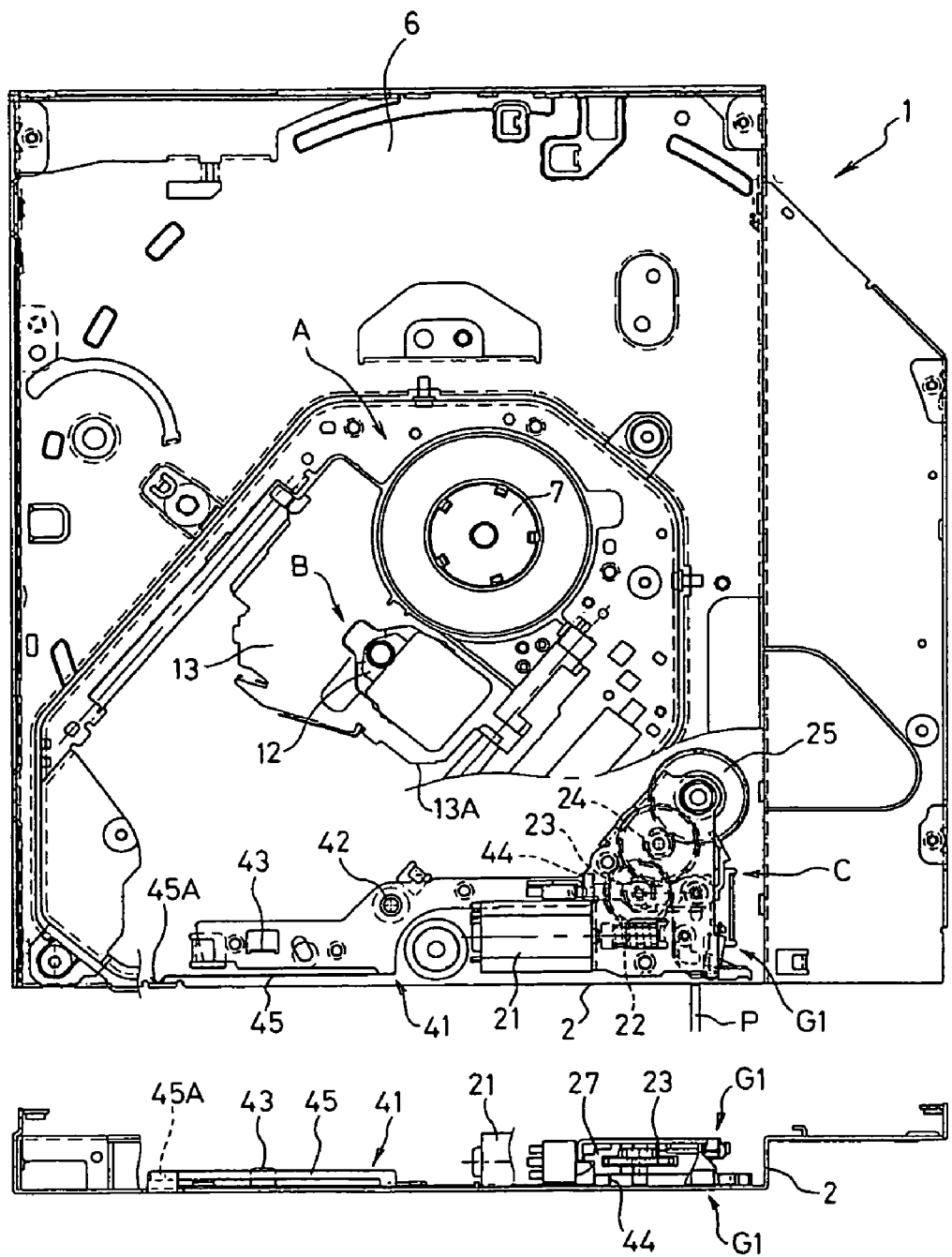
FIG. 12 is a view for explaining a state in which manual ejection is prohibited.
Figure 13:
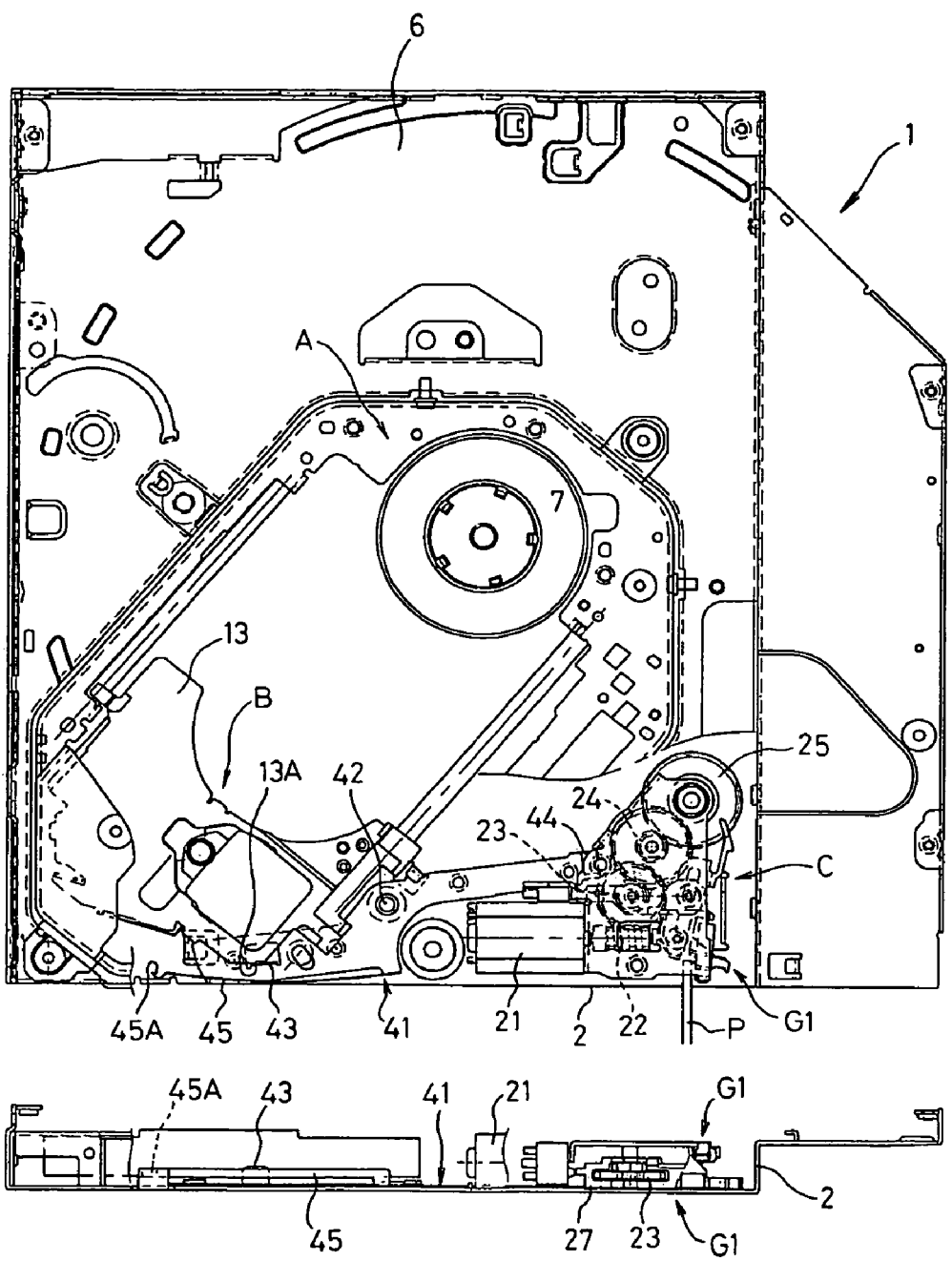
FIG. 13 is a view for explaining a state in which manual ejection is allowed.
Figure 14:
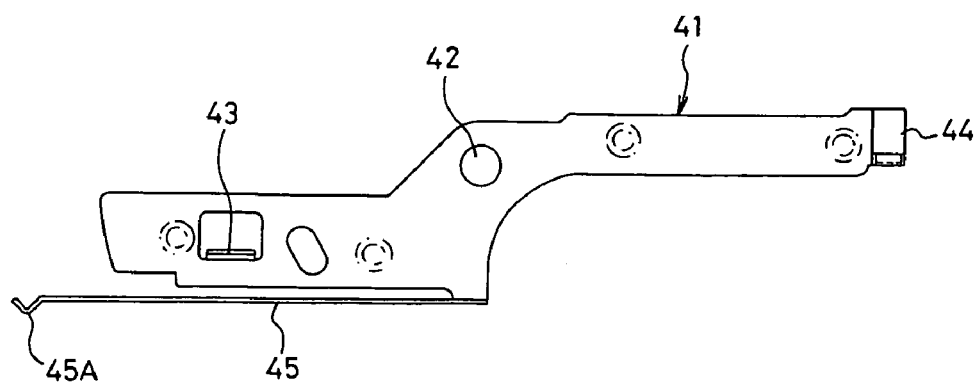
FIG. 14 is a view for explaining manual ejection prohibiting means.
Figure 14:
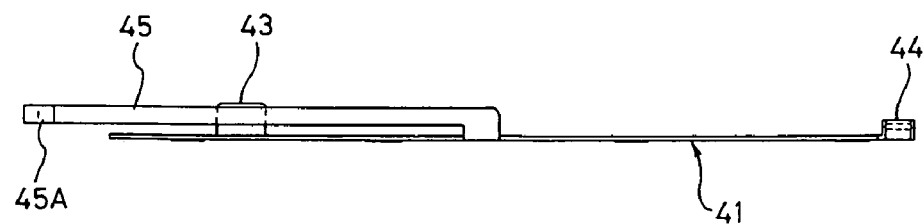

Also, in the disc drive device 1 according to the present invention, as shown in FIGS. 12 and 13, a manual ejection prohibiting means 41 is provided. As shown in FIG. 14, the manual ejection prohibiting means 41 comprises an elongated plate-shaped element. A bearing hole 42 is defined at a lengthwise middle portion of the elongated plate-shaped element. A driven part 43 is formed at one end of the elongated plate-shaped element, and a prohibiting part 44 is formed at the other end of the elongated plate-shaped element. An elastic member 45 is installed adjacent to the driven part 43.

The driven part 43 is formed by erecting a 'U'-shaped cut portion of the elongated plate-shaped element. The prohibiting portion 44 is formed by bending the elongated plate-shaped element in the shape of a door. Further, the elastic member 45 is formed by erecting a rod-shaped element which extends parallel to the elongated plate-shaped element adjacent to the driven part 43. The elastic member 45 has a contact part 45A which is bent in the shape of 'V'.

In the manual ejection prohibiting means 41 constructed as mentioned above, a pivot shaft (not shown) which projects from the lower surface of the chassis case 2 is fitted into the bearing hole 42 which is defined at the lengthwise middle portion of the elongated plate-shaped element, whereby the manual ejection prohibiting means 41 can be rotated from a position where the prohibiting part 44 is not placed on a portion of the loading gear unit G1 of the conveying mechanism C to a position where the prohibiting part 44 is placed on the portion of the loading gear unit G1 of the conveying mechanism C.

Specifically, the manual ejection prohibiting means 41 has been mounted as follows. If a corner portion 13A of the carrier block 13 which is moved to a circumferential moving end of the optical disc D is brought into contact with the driven part 43, as the entire manual ejection prohibiting means 41 is rotated in a direction where the contact part 45A is brought into contact with a side wall of the chassis case 2 about the bearing hole 42 so that the contact part 45A is brought into contact with a side wall of the chassis case 2 and the elastic member 45 is bent to allow its middle portion to be brought into contact with the side wall of the chassis case 2, the prohibiting part 44 is removed from between the holder 27 which supports the double gear 23 and the lower plate of the chassis case 2. Also, if the carrier block 13 is moved to another place and force of the corner portion 13A for pressing the driven part 43 is removed, by the elastic force accumulated in the elastic member 45, as the entire manual ejection prohibiting means 41 is rotated in an opposite direction about the bearing hole 42, the prohibiting part 44 is interposed between the holder 27 and the lower plate of the chassis case 2.

Accordingly, in the disc drive device 1 of the present invention, excluding when the carrier block 13 is moved to the circumferential moving end of the optical disc D and the corner portion 13A presses the driven part 43 of the manual ejection prohibiting means 41, the prohibiting part 44 of the manual ejection prohibiting means 41 is interposed between the holder 27 of the double gear 23 and the lower plate of the chassis case 2, whereby the holder 27 is prevented from being moved toward the lower plate of the chassis case 2.

According to such a construction, even though the emergency pin P is inserted into the through-hole 3b defined in the bezel 3 to press the slider member 31 of the loading gear unit G1, excluding when the corner portion 13A presses the driven part 43 of the manual ejection prohibiting means 41, the holder 27 for the double gear 23 cannot be moved toward the lower plate of the chassis case 2. Therefore, the slider member 31 is prevented from being tilted, and the plugged state in which the through-hole 3c is plugged by the plugging projection 31e is not released.

As a consequence, excluding when the carrier block 13 is moved to the circumferential moving end of the optical disc D and the corner portion 13A presses the driven part 43 of the manual ejection prohibiting means 41, irrespective of whether or not there is an intention for ejecting the optical disc D, even though the emergency pin P is inserted into the hole 3c, it is impossible to eject the optical disc D. In other words, since the optical disc D is prevented from being ejected while being in a writing mode in which information is recorded on the optical disc D, incomplete recording of information or breakage of already recorded information can be prevented.

Figure 15:
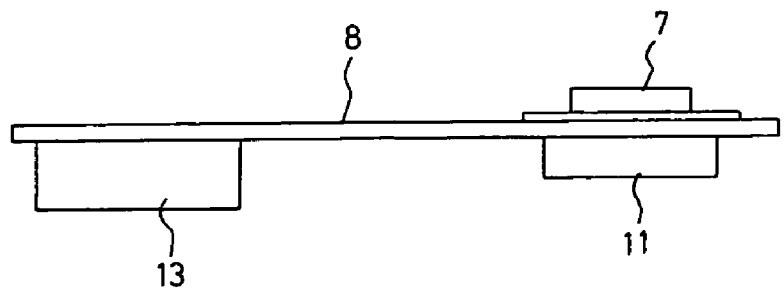
FIG. 15 is a view for explaining operations of a frame member.
Figure 15:
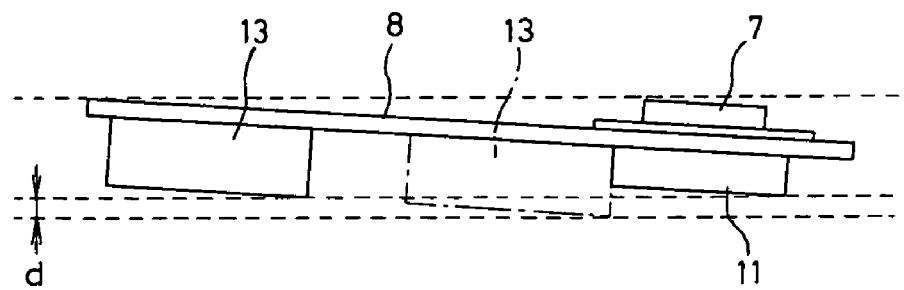

Also, when compared to the conventional disc drive device 101, in the disc drive device 1 of the present invention which has the above-described features, it is possible to reduce a thickness of the entire device. Specifically, as shown in FIG. 15, the frame member 8 on which the clamp head 7, spindle motor 11, carrier block 13, etc. are mounted is driven to be moved upward and downward about a rotation driving axis which corresponds to a position of the bezel (the left end in the drawing).

FIG. 15A illustrates a state in which the frame member 8 is pivoted upward (an optical disc clamping state), and FIG. 15B illustrates a state in which the frame member 8 is pivoted downward (an optical disc ejecting state). As can be readily seen from the drawings, between the spindle motor 11 and the carrier block 13 which are mounted on the frame block 8, the carrier block 13 downwardly projects more than the spindle motor 11.

However, in the disc drive device 1 of the present invention, only when the carrier block 13 is placed on the circumferential moving end of the optical disc D, that is, at a position shown by the solid line in FIG. 15B, the optical disc D can be ejected. When the carrier block 13 is placed at other positions, for example, as shown by the one-dot-chain line in FIG. 15B, even when the user tries to manually eject the optical disc D using the emergency pin P, the manual ejection prohibiting means 41 functions to prevent the optical disc D from being ejected. Therefore, even when the disc drive device 1 is manufactured to have a thickness which is reduced by a thickness of the optical disc D, upon compulsively and manually ejecting the optical disc D, the carrier block 13 is prevented from being collided against the chassis case 2, whereby the probability of breakdown of the disc drive device 1 to occur is eliminated.

Figure 16:
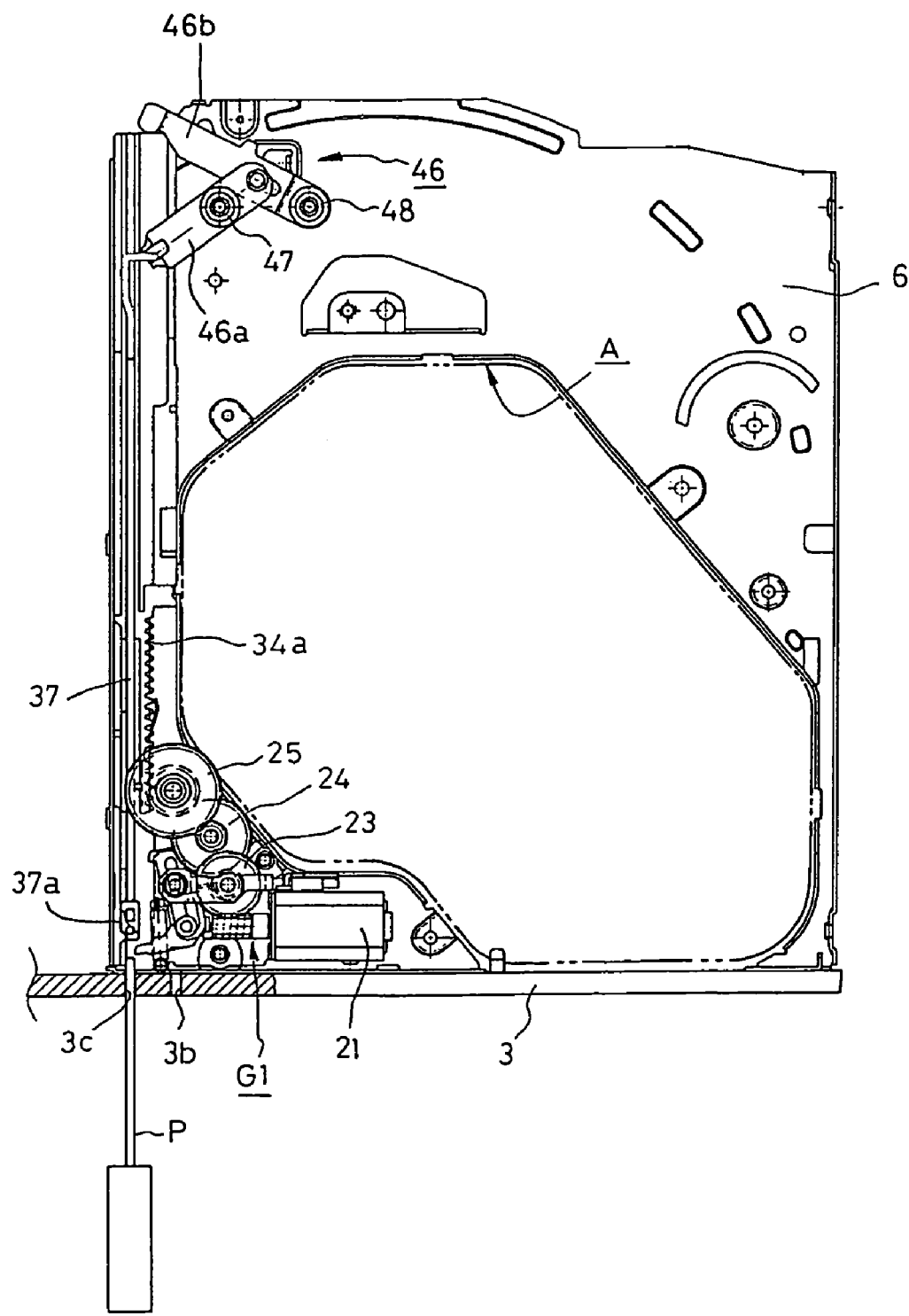
FIG. 16 is a view illustrating another example of a mechanism for operating a rack gear unit.
Figure 17:
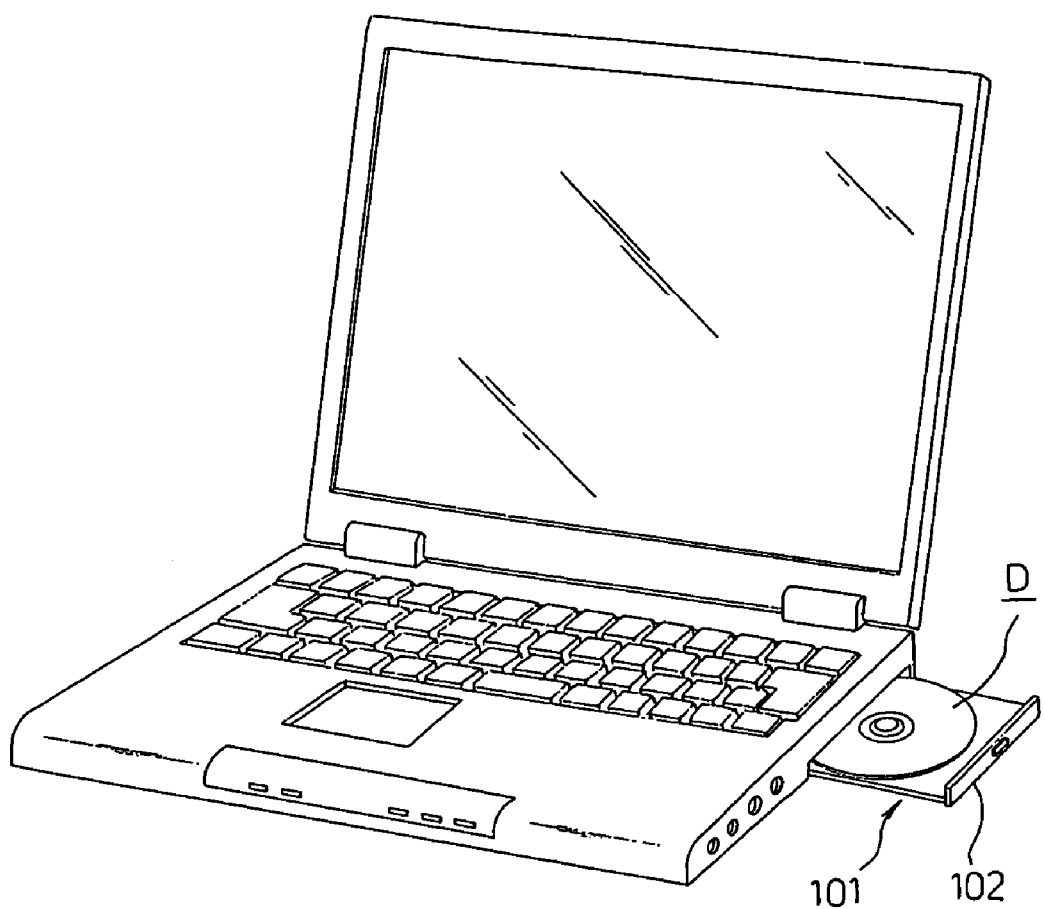
FIG. 17 is a perspective view illustrating an outer appearance of a notebook type personal computer.

FIG. 16 is a view illustrating another example of the operating mechanism of the rack gear unit G2. The front end of the push pin 37 is connected to a link arm 46a of a link mechanism 46. By pressing the link arm 46a and thereby rotating the link arm 46a about a pivot shaft 47 in a clockwise direction, a link arm 46b is rotated in a counter-clockwise direction about a support shaft 48. By this fact, since a distal end of the link arm 46b presses the end of the rack main body 34, the rack main body 34 is moved forward and performs the same function as mentioned above.

What is claimed is:

1. A recording medium drive device comprising a recording medium entrance port through which a recording medium is inserted into and ejected from the device, a recording medium mounting section which supports the recording medium inserted into the device through the recording medium entrance port and performs a function of reading information from the recording medium and/or writing information on the recording medium, an automatic ejection mechanism which has an electrical drive means operating in response to a switching action to automatically eject through the recording medium port the recording medium mounted on the recording medium mounting section, and a manual ejection mechanism which is provided to a casing which has no electrical drive means and allows the recording medium mounted on the recording medium mounting section to be manually manipulated and ejected through the recording medium entrance port, wherein a manual ejection prohibiting means is installed in the device to prohibit the manual ejection mechanism from being operated when the recording medium mounting section is in a predetermined state.

2. The recording medium drive device according to claim 1, wherein the recording medium has a disc-shaped configuration;

the recording medium mounting section comprises recording medium supporting means for rotatably supporting the recording medium, and head means which is installed to be movable in a radial direction of the recording medium supported by the recording medium supporting means for reading recorded information from the recording medium and/or writing information on the recording medium; and the manual ejection prohibiting means allows the manual ejection mechanism to be operated when the head means is positioned on a circumferential moving end of the recording medium and prohibits the manual ejection mechanism from being operated when the head means is not positioned on the circumferential moving end of the recording medium.

3. The recording medium drive device according to claim 2,
wherein the manual ejection prohibiting means comprises a driven part which is not driven by the head means in a pressed manner when the head means is not positioned on the circumferential moving end of the recording medium and is driven by the head means in a pressed manner when the head means is moved to the circumferential moving end of the recording medium, and a prohibiting part which allows the manual ejection mechanism to be operated when the driven part is driven by the head means in the pressed manner and which prohibits the manual ejection mechanism from being operated when the driven part is not driven by the head means in the pressed manner.

4. The recording medium drive device according to claim 3,
wherein, when the head means is not positioned at the circumferential moving end of the recording medium and the driven part is not driven in the pressed manner, the prohibiting part is interposed between a movable part of the manual ejection mechanism and the casing to prevent the movable part from being moved toward the casing to thereby prohibit the manual ejection mechanism from being operated, and, when the driven part is driven in the pressed manner by the head means moved to the circumferential moving end of the recording medium, the prohibiting part is not interposed between the movable part of the manual ejection mechanism and the casing to permit the movable part to be moved toward the casing to thereby allow the manual ejection mechanism to be operated.

* * * * *